(12) United States Patent
Wargo

(10) Patent No.: US 12,085,348 B1
(45) Date of Patent: Sep. 10, 2024

(54) GUN LOCK-OUT SYSTEM

(71) Applicant: Kent James Wargo, Minneapolis, MN (US)

(72) Inventor: Kent James Wargo, Minneapolis, MN (US)

( * ) Notice: Subject to any disclaimer, the term of this patent is extended or adjusted under 35 U.S.C. 154(b) by 0 days.

(21) Appl. No.: 18/142,260

(22) Filed: May 2, 2023

(51) Int. Cl.
*F41A 17/06* (2006.01)
*H04R 1/08* (2006.01)

(52) U.S. Cl.
CPC ............ *F41A 17/06* (2013.01); *F41A 17/066* (2013.01); *H04R 1/08* (2013.01)

(58) Field of Classification Search
CPC ......... F41A 17/066; F41A 17/06; F41A 17/00
See application file for complete search history.

(56) References Cited

U.S. PATENT DOCUMENTS

| | | | |
|---|---|---|---|
| 5,636,464 A | 6/1997 | Ciluffo | |
| 6,412,207 B1 | 7/2002 | Crye | |
| 7,188,444 B2 | 3/2007 | Danner | |
| 11,080,978 B1 * | 8/2021 | Goldstein | ............... G08B 13/16 |
| 11,156,420 B1 | 10/2021 | Clark | |
| 11,326,847 B1 * | 5/2022 | Bango | .................. F41A 17/063 |
| 2020/0080810 A1 | 3/2020 | Imbriano | |
| 2022/0074691 A1 | 3/2022 | Delgado Acarreta | |
| 2024/0022565 A1 * | 1/2024 | Keith, Jr. | ............ H04L 63/0861 |
| 2024/0029541 A1 * | 1/2024 | Millican | ............... H04W 4/029 |

FOREIGN PATENT DOCUMENTS

| WO | WO9744630 | 11/1997 |
|---|---|---|
| WO | WO2020057520 | 3/2020 |

* cited by examiner

*Primary Examiner* — J. Woodrow Eldred

(57) ABSTRACT

An audio controlled firearm locking system for locking a firearm while screaming is occurring proximate to the firearm includes a locking module and an electronics module, which are mountable to the firearm. The locking module is selectively engageable to at least one movable element of the firearm, movement of which is required to discharge the firearm, thereby allowing the locking module to selectively lock the firearm. The electronics module comprises a battery, a microprocessor, and a microphone. The microprocessor is operationally engaged to the locking module, the battery, and the microphone, which detects audio signals proximate to the firearm and relay the audio signals to the microprocessor. The microprocessor is programmed to analyze the audio signals for an indication of a screaming event. When a screaming event is indicated, the microprocessor actuates the locking module to prevent discharge of the firearm.

12 Claims, 9 Drawing Sheets

GUN LOCK-OUT SYSTEM

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to firearm locks and more particularly pertains to a new firearm lock for locking a firearm while screaming is occurring proximate to the firearm. Shootings, and in particular mass shootings, nearly always will induce screams from those near a firearm that is being used. Unfortunately, there currently are no means of locking a firearm due to screaming of potential victims.

(2) Description of Related Art Including Information Disclosed Under 37 CFR 1.97 and 1.98

The prior art relates to firearm locks, which are intended to prevent unauthorized use of a firearm. The prior art does not disclose a firearm lock that engages when screams occur proximate to the firearm to which the firearm lock is engaged.

BRIEF SUMMARY OF THE INVENTION

An embodiment of the disclosure meets the needs presented above by generally comprising a locking module and an electronics module, which are mountable to a firearm. The locking module is selectively engageable to at least one movable element of the firearm, movement of which is required to discharge the firearm. The locking module thus is configured to selectively lock the firearm. The electronics module comprises a battery, a microprocessor, and a microphone. The microprocessor is operationally engaged to the locking module, the battery, and the microphone. The microphone detects audio signals proximate to the firearm and relays the audio signals to the microprocessor. The microprocessor is programmed to analyze the audio signals for an indication of a screaming event. When a screaming event is indicated, the microprocessor actuates the locking module to prevent discharge of the firearm.

Another embodiment of the disclosure includes a method of locking a firearm. Steps of the method are a screaming event occurring in proximity to a firearm, capturing of the screaming event by an electronics module mounted in the firearm, and actuating a locking module electrically coupled to the electronics module and operationally engaged to at least one movable element of the firearm. Actuation of the locking module prevents discharging of the firearm.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
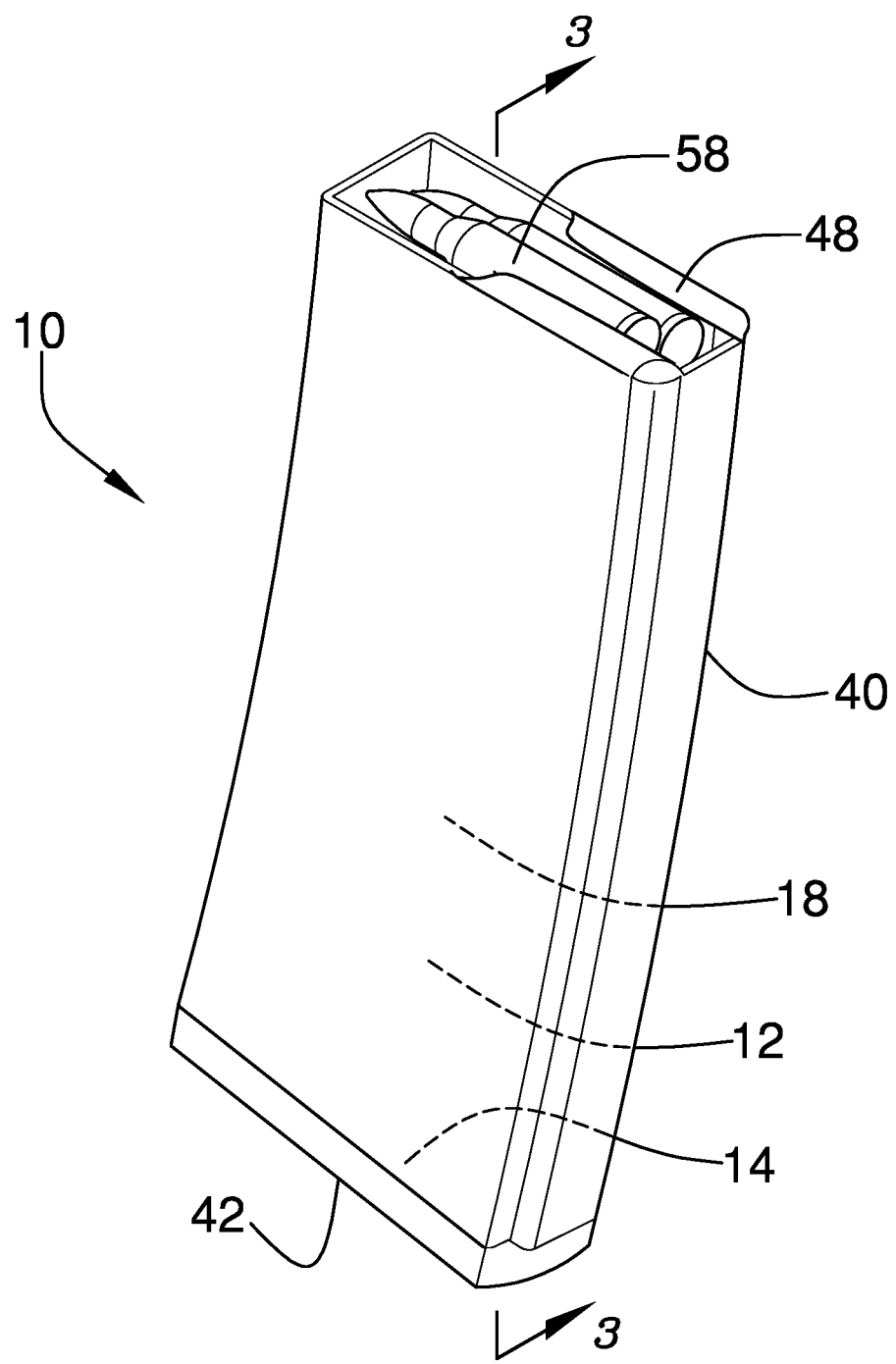
FIG. 1 is an isometric perspective view of an audio controlled firearm locking system according to an embodiment of the disclosure.
Figure 2:
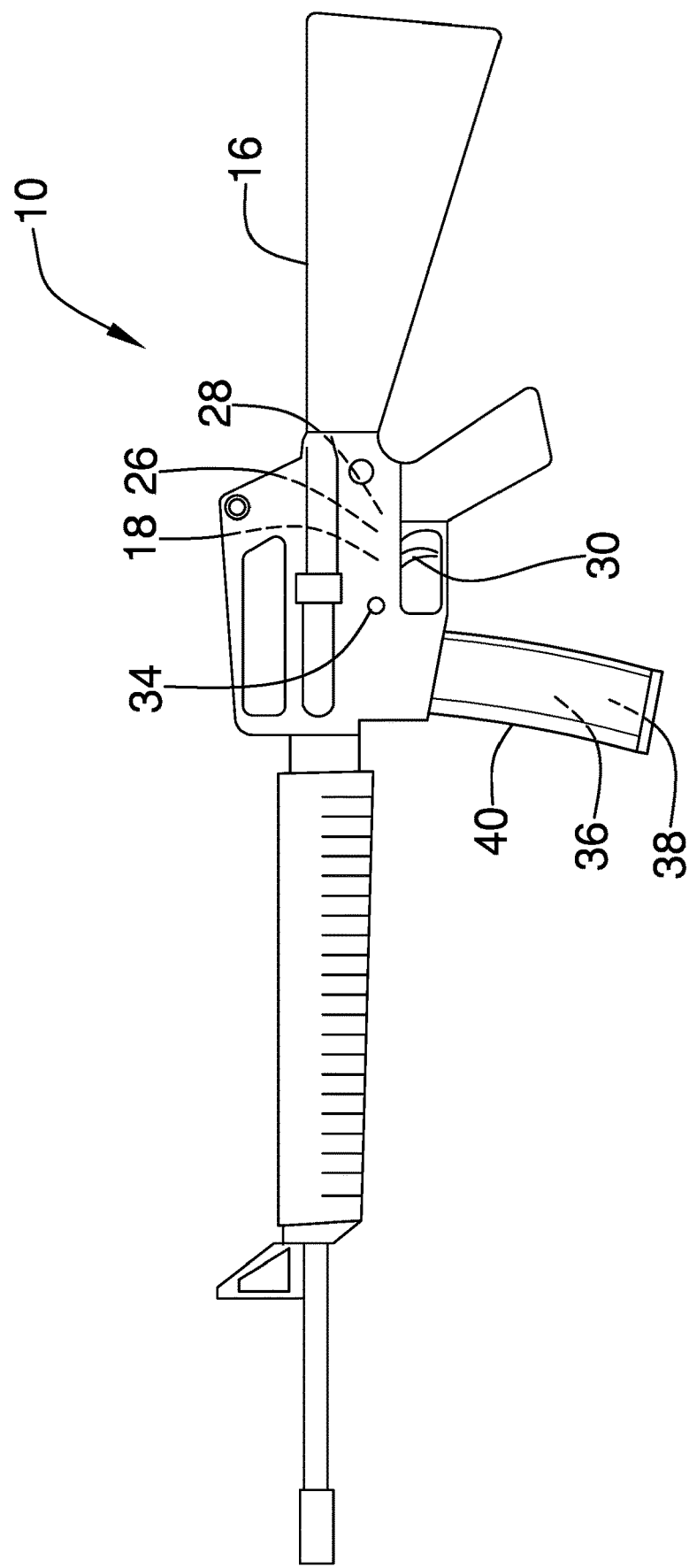
FIG. 2 is a side view of an embodiment of the disclosure.
Figure 3:
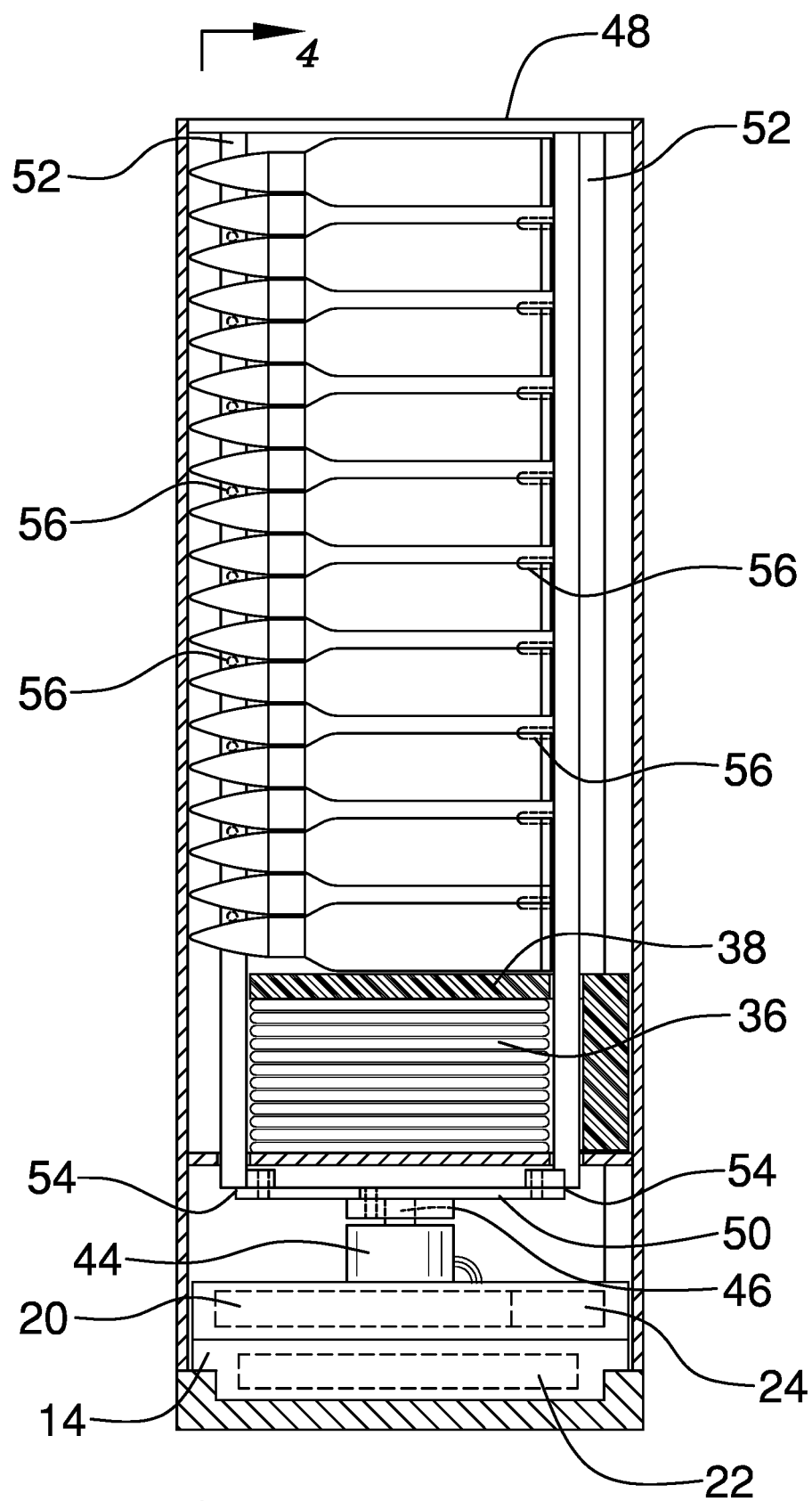
FIG. 3 is a side cross-sectional view of an embodiment of the disclosure in an activated state.
Figure 4:
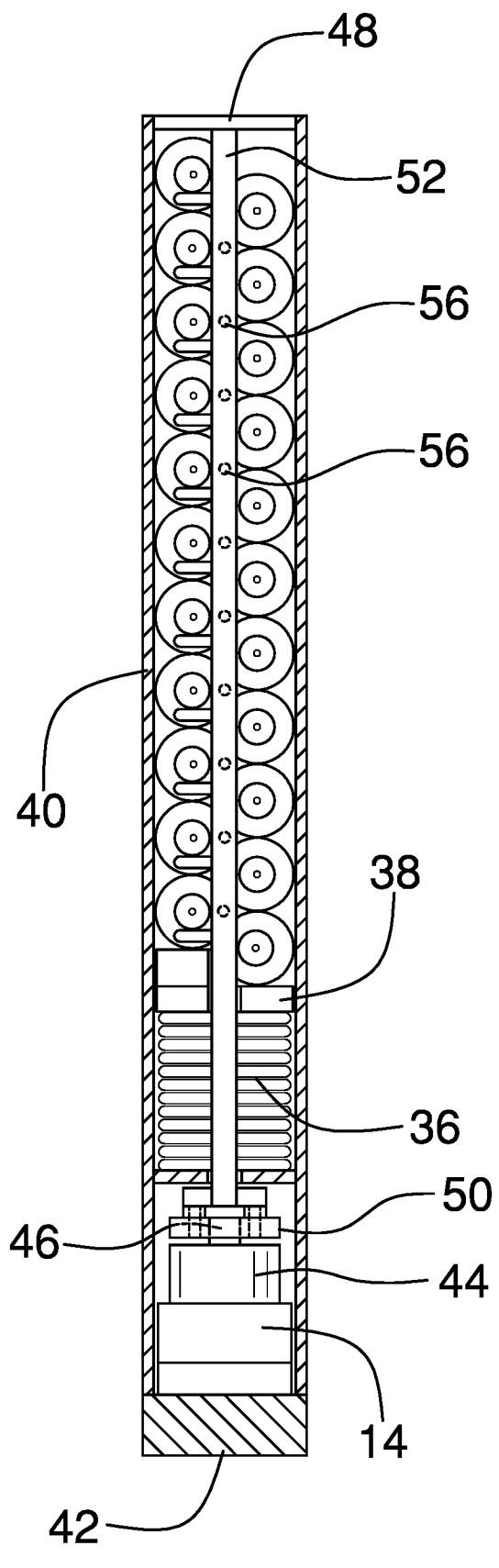
FIG. 4 is an end cross-sectional view of an embodiment of the disclosure in an activated state.
Figure 5:
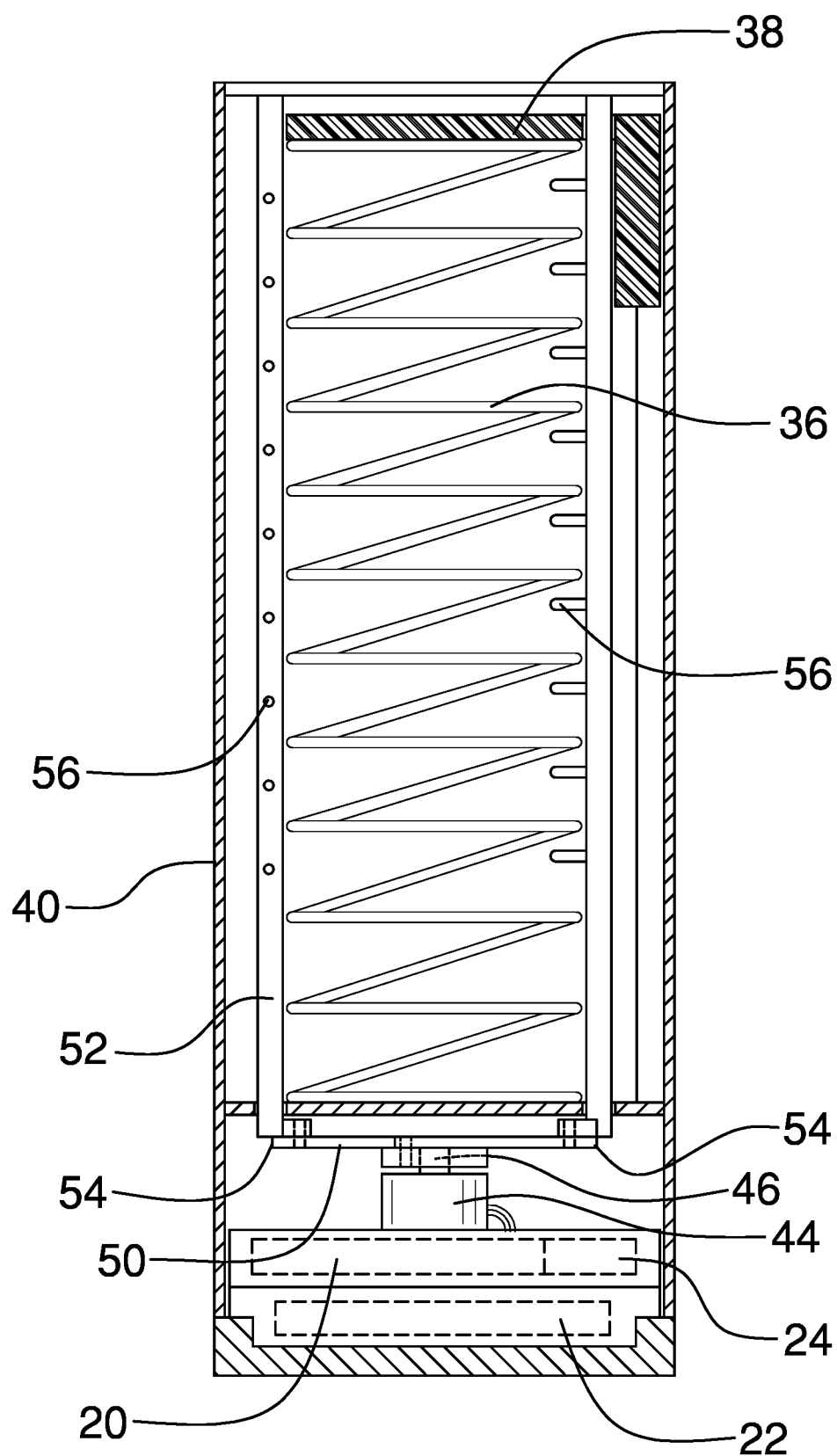
FIG. 5 is a side cross-sectional view of an embodiment of the disclosure in an activated state.
Figure 6:
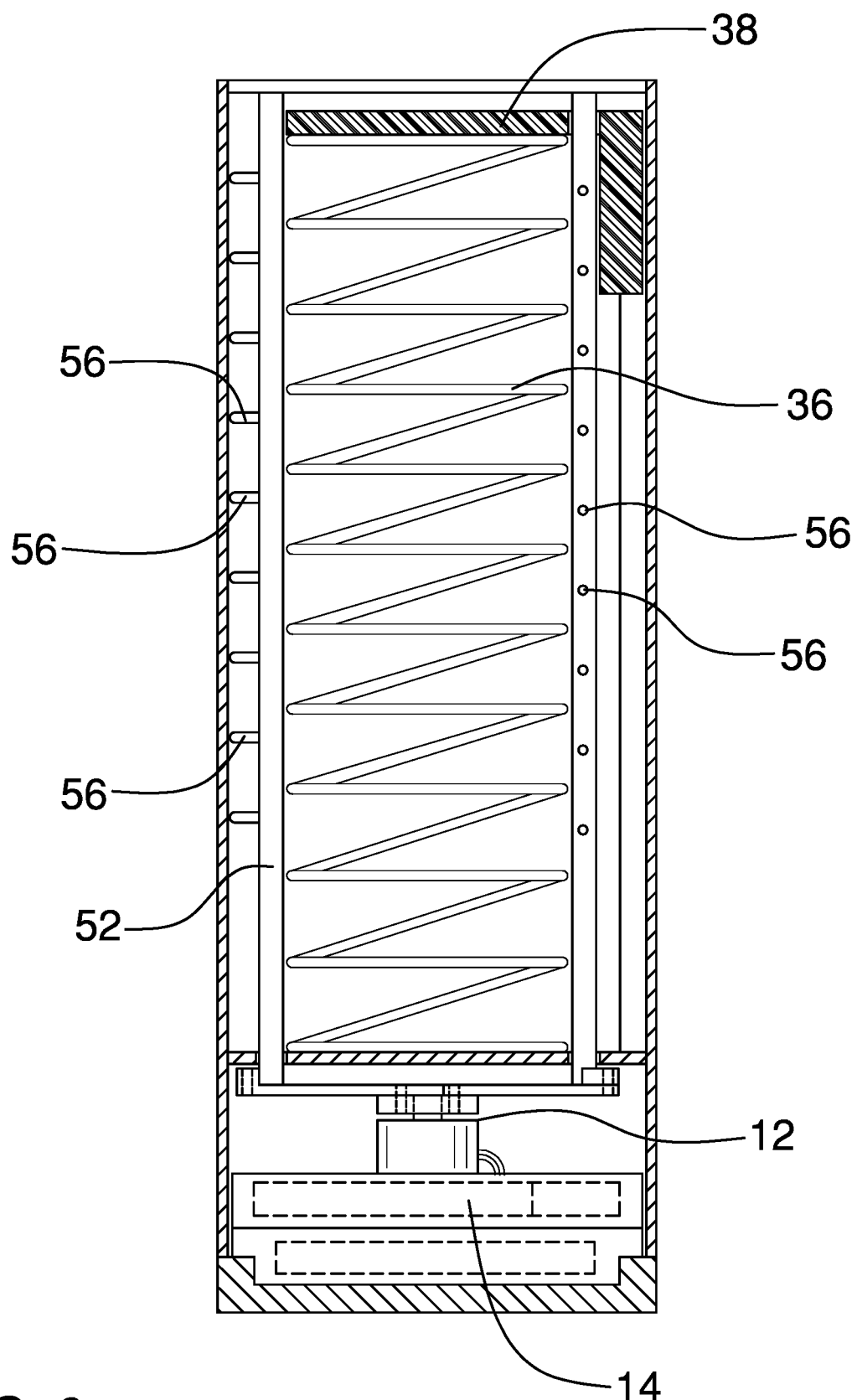
FIG. 6 is a side cross-sectional view of an embodiment of the disclosure in a deactivated state.

With reference now to the drawings, and in particular to FIGS. 1 through 10 thereof, a new firearm lock embodying the principles and concepts of an embodiment of the disclosure and generally designated by the reference numeral 10 will be described.

As best illustrated in FIGS. 1 through 10, the audio controlled firearm locking system 10 generally comprises a locking module 12 and an electronics module 14, which are mountable to a firearm 16. The locking module 12 is selectively engageable to at least one movable element 18 of the firearm 16, movement of which is required to discharge the firearm 16. The locking module 12 thus is configured to selectively lock the firearm 16. The electronics module 14 comprises a battery 20, a microprocessor 22, and a microphone 24. The microprocessor 22 is operationally engaged to the locking module 12, the battery 20, and the microphone 24. The microphone 24 detects audio signals proximate to the firearm 16 and relays the audio signals to the microprocessor 22. The microprocessor 22 is programmed to analyze the audio signals for an indication of a screaming event. When a screaming event is indicated, the microprocessor 22 actuates the locking module 12 to prevent discharge of the firearm 16.

Screams are sustained, high-energy vocalizations that lack phonological structure. Lack of phonological structure is how a scream is differentiated from other loud vocalizations, such as shouts, yells, hollers, or the like. In the present invention, the indication of the screaming event by the microprocessor 22 is based upon the microprocessor 22 receiving an audio signal lacking phonological structure, having a frequency of at least 175 Hz, and having a volume of least 80 dB. The indication of the screaming event by the microprocessor 22 may be based upon the microprocessor 22 receiving an audio signal lacking phonological structure, having a frequency of at least 200 Hz, and having a volume of least 90 dB.

The microprocessor 22 is programmed to actuate the locking module 12 when the screaming event has a continuous a duration of a predetermined amount of time. The duration of the predetermined amount of time may be at least 3.0 seconds or may be at least 5.0 seconds. The microprocessor 22 also may be programmed to deactivate the locking module 12 after a predetermined interval, such as, but not limited to, five minutes, seven minutes, ten minutes, or the like.

The present invention anticipates the microprocessor 22 of the audio controlled firearm locking system 10 being programmed for audio recognition within the specified dB and Hz ranges of this specification. As such, the microprocessor 22 could be programmed to ignore the screams of the user and/or other specific individuals. The audio recognition programming thus could prevent locking of the firearm 16 in self-defense situations wherein the user and/or the other specific individuals are themselves screaming, such as might occur during a home invasion, a carjacking, or the like.

The locking module 12 is configured to selectively lock the firearm 16 by selective engagement of the locking module 12 to one or more of an action 26, a firing mechanism 28, a trigger 30, a firing pin block 32, a safety 34, or other movable element 18 of the firearm 16. The locking module 12 also may be configured to selectively lock the firearm 16 by selective engagement of the locking module 12 to one or more a spring 36 and a follower 38 of a magazine 40, which is insertable into the firearm 16, and ammunition 58, which is loaded in the magazine 40.

Figure 7:
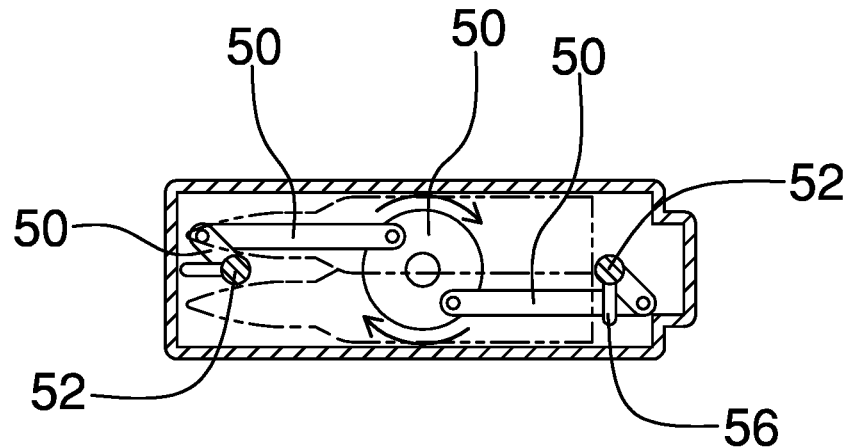
FIG. 7 is a top cross-sectional view of an embodiment of the disclosure in an deactivated state.
Figure 8:
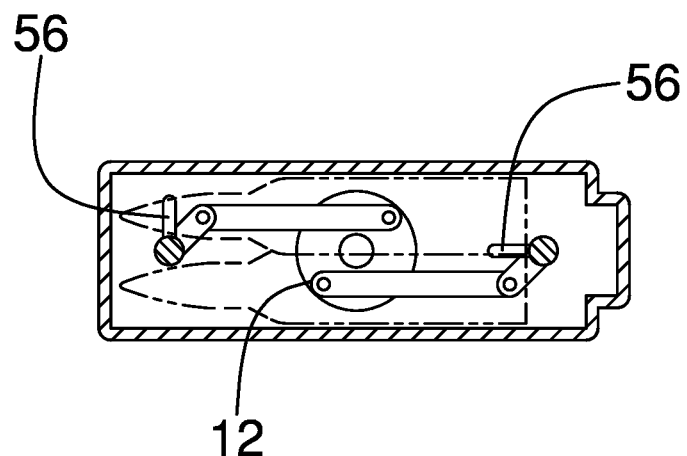
FIG. 8 is a top cross-sectional view of an embodiment of the disclosure in an activated state.

The present invention anticipates the locking module 12 and the electronics module 14 being integral to the firearm 16 or to the magazine 40. In one example of the audio controlled firearm locking system 10, as is depicted in FIGS. 1-8, the locking module 12 and the electronics module 14 are mounted to a magazine 40 that is insertable into the firearm 16. The electronics module 14 is positioned adjacent to a lower end 42 of the magazine 40. In this embodiment, the locking module 12 comprises a motor 44, which is attached to the magazine 40 below the follower 38 of the magazine 40 and which is operationally engaged to the electronics module 14. A shaft 46 of the motor 44 extends toward an upper end 48 of the magazine 40. A linkage 50 is attached to and extends bidirectionally from the shaft 46 of the motor 44. The rods 52 of a pair of rods 52 are attached singly to and extend from opposed ends 54 of the linkage 50. The rods 52 bracket the spring 36 of the magazine 40 and are rotationally attached to the upper end 48 of the magazine 40. A plurality of pins 56 is attached to and extends from the pair of rods 52. Upon actuation of the locking module 12 by the microprocessor 22, the rods 52 rotate and the pins 56 are inserted between one or both of coils of the spring 36 and rounds of ammunition 58 in the magazine 40, as is shown in FIGS. 7 and 8. The pins 56 being inserted between one or both of coils of the spring 36 and the rounds of ammunition 58 in the magazine 40 prevents the spring 36 from advancing the follower 38, whereupon the magazine 40 is prevented from feeding the ammunition 58 to the firearm 16.

Figure 9:
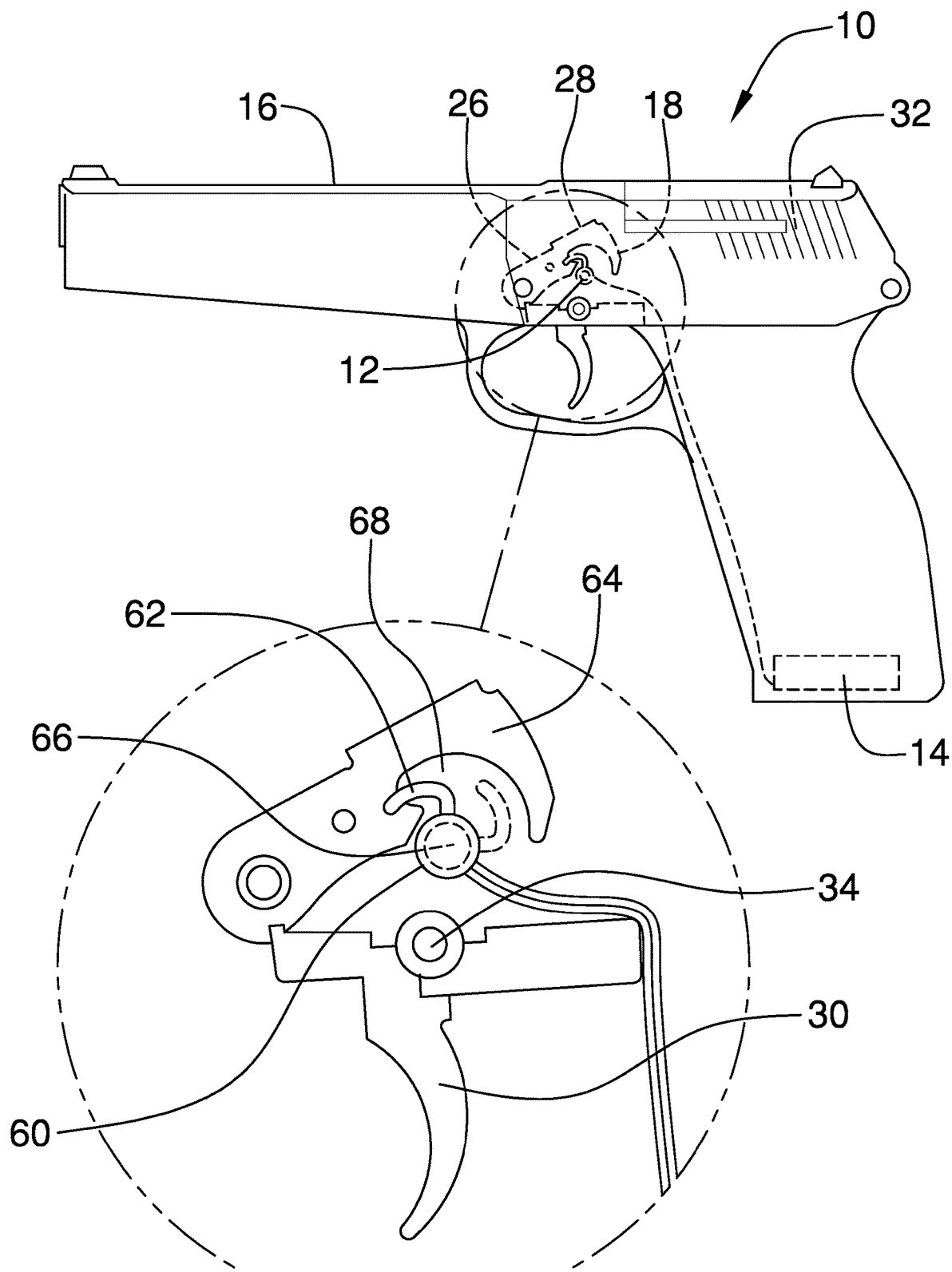
FIG. 9 is a side view of an embodiment of the disclosure.
Figure 10:
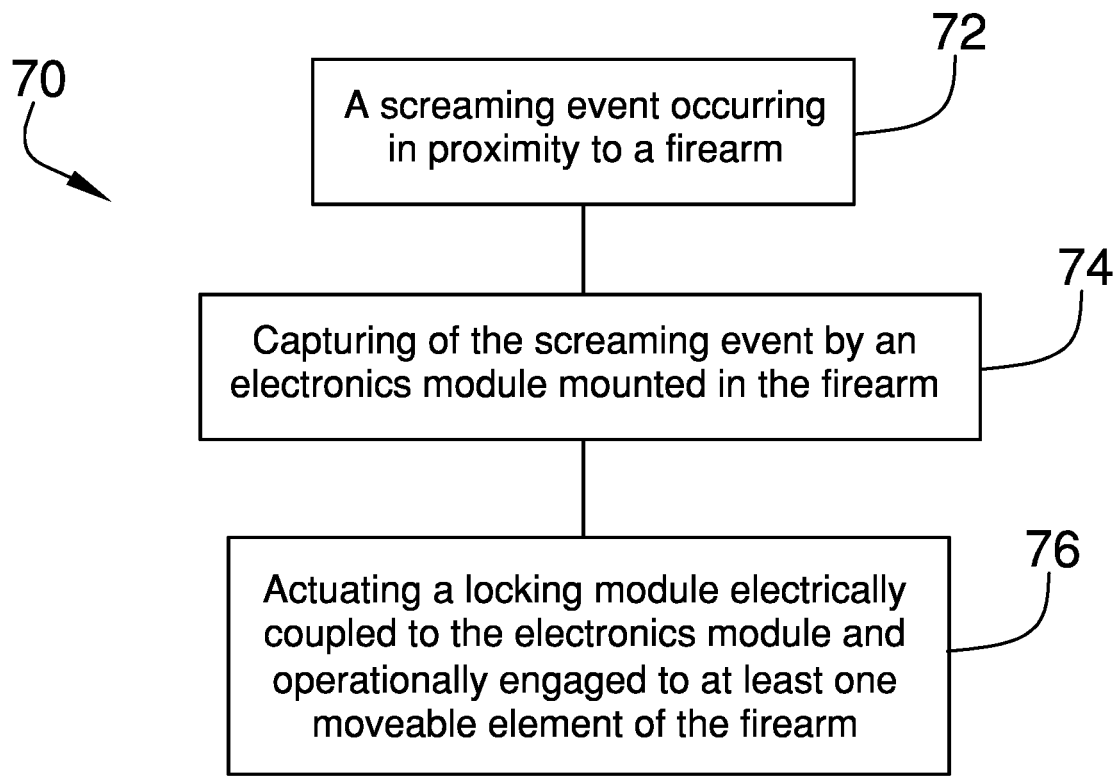
FIG. 10 is a flow diagram for a method utilizing an embodiment of the disclosure.

In another example of the audio controlled firearm locking system 10, as is shown in FIG. 9, the locking module 12 and the electronics module 14 are mounted to the firearm 16. In this embodiment, the locking module 12 comprises an actuator 60 and a hook 62. The actuator 60 is attached to the firearm 16 proximate to a hammer 64 of the firing mechanism 28. The hook 62 is attached to a cylinder 66 of the actuator 60. Upon actuation of the locking module 12 by the microprocessor 22, the cylinder 66 rotates the hook 62 into a notch 68 in the hammer 64. The hammer 64 thus is prevented from striking a round of ammunition 58 in a chamber 68 of the firearm 16, whereupon discharging of the firearm 16 is prevented.

The examples above are not intended to limit the scope of the invention in any manner. Rather, they are provided merely to demonstrate two configurations of a wide variety of potential configurations for the audio controlled firearm locking system 10.

In use, the audio controlled firearm locking system 10 enables a method of locking a firearm 70. A first step 72 of the method 70 is a screaming event occurring in proximity to a firearm 16. A second step 74 of the method 70 is capturing of the screaming event by an electronics module 14 mounted in the firearm 16. A third step 76 of the method 70 is actuating a locking module 12, which is electrically coupled to the electronics module 14 and operationally engaged to at least one movable element 18 of the firearm 16. Actuation of the locking module 12 prevents discharging of the firearm 16.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. Audio controlled firearm locking system comprising:
a locking module being mountable to a firearm and being selectively engageable to at least one movable element of the firearm, wherein a movement of the movable element is required for discharging the firearm such that the locking module is configured to selectively lock the firearm; and
an electronics module being mountable to the firearm, the electronics module comprising:
a battery;
a microprocessor operationally engaged to the locking module and the battery;
a microphone operationally engaged to the microprocessor for detecting audio signals proximate to the firearm and relaying the audio signals to the microprocessor; and
the microprocessor being programmed to analyze the audio signals for an indication of a screaming event, the microprocessor actuating the locking module to prevent discharge of the firearm when the screaming event is indicated.

2. The controlled firearm locking system of claim 1, wherein the indication of the screaming event by the microprocessor is based upon the microprocessor receiving an audio signal lacking phonological structure, having a frequency of at least 175 Hz, and a volume of least 80 dB.

3. The controlled firearm locking system of claim 1, wherein the indication of the screaming event by the microprocessor is based upon the microprocessor receiving an audio signal lacking phonological structure, having a frequency of at least 200 Hz, and a volume of least 90 dB.

4. The controlled firearm locking system of claim 1, wherein the microprocessor is programmed actuate the locking module when the screaming event has a continuous a duration of a predetermined amount of time.

5. The controlled firearm locking system of claim 4, wherein the duration of the predetermined amount of time is at least 3.0 seconds.

6. The controlled firearm locking system of claim 4, wherein the duration of the predetermined amount of time is at least 5.0 seconds.

7. The controlled firearm locking system of claim 4, wherein the microprocessor is programmed to deactuate the locking module after a predetermined interval.

8. The controlled firearm locking system of claim 1, wherein the locking module and the electronics module are integral to the firearm or to a magazine, the magazine being insertable into the firearm.

9. The controlled firearm locking system of claim 8, wherein the locking module is configured to lock the firearm by selective engagement of the locking module to one or more of:
an action, a firing mechanism, a trigger, a firing pin block, and a safety of the firearm;
a spring and a follower of the magazine; and
ammunition loaded in the magazine.

10. The controlled firearm locking system of claim 9, wherein the locking module comprises:
a motor attached to the magazine below the follower of the magazine, such that a shaft of the motor extends toward an upper end of the magazine, the motor being operationally engaged to the electronics module;
a linkage attached to and extending bidirectionally from the shaft of the motor;
a pair of rods attached singly to and extending from opposed ends of the linkage, the rods of the pair of rods bracketing the spring of the magazine and being rotationally attached to the upper end of the magazine; and
a plurality of pins attached to and extending from the pair of rods, such that, upon actuation of the locking module by the microprocessor, the rods of the pair of rods rotate and the pins of the plurality of pins are inserted between one or both of coils of the spring and rounds of ammunition in the magazine, thereby preventing the spring from advancing the follower, whereupon the magazine is prevented from feeding the ammunition to the firearm.

11. The controlled firearm locking system of claim 9, wherein the locking module comprises:
an actuator being attached to the firearm proximate to a hammer of the firing mechanism; and
a hook being attached to a cylinder of the actuator, such that, upon actuation of the locking module by the microprocessor, the cylinder rotates the hook into a notch in the hammer, such that the hammer is prevented from striking a round of ammunition in a chamber of the firearm, whereupon discharging of the firearm is prevented.

12. A method of locking a firearm comprising the steps of:
a screaming event occurring in proximity to a firearm;
capturing of the screaming event by an electronics module mounted in the firearm; and
actuating a locking module electrically coupled to the electronics module and operationally engaged to at least one movable element of the firearm, wherein actuation of the locking module prevents discharging of the firearm.

\* \* \* \* \*